United States Patent Office 3,573,902
Patented Apr. 6, 1971

3,573,902
YTTRIUM-CONTAINING WELDING ALLOYS
Eugene J. Delgrosso, 1468 Tuttle Ave.,
Wallingford, Conn. 06492
Filed Mar. 10, 1967, Ser. No. 623,184
Int. Cl. C22c 27/00
U.S. Cl. 75—174
4 Claims

ABSTRACT OF THE DISCLOSURE

An yttrium-containing alloy for welding filler rods to be used in welding and joining reactive-refractory metal alloy substrates. The alloy is created by nonconsumable arc-melting and contains from 1 to 6% by weight of *retained* yttrium with the balance consisting essentially of one or more of the reactive-refractory metals, including titanium, zirconium, and the refractory metals. The alloy is particularly effective in preventing and reducing oxygen contamination of weldments and substrates during high-temperature welding of reactive-refractory metal alloys under field of less-than-ideal conditions.

---

Figure 1:
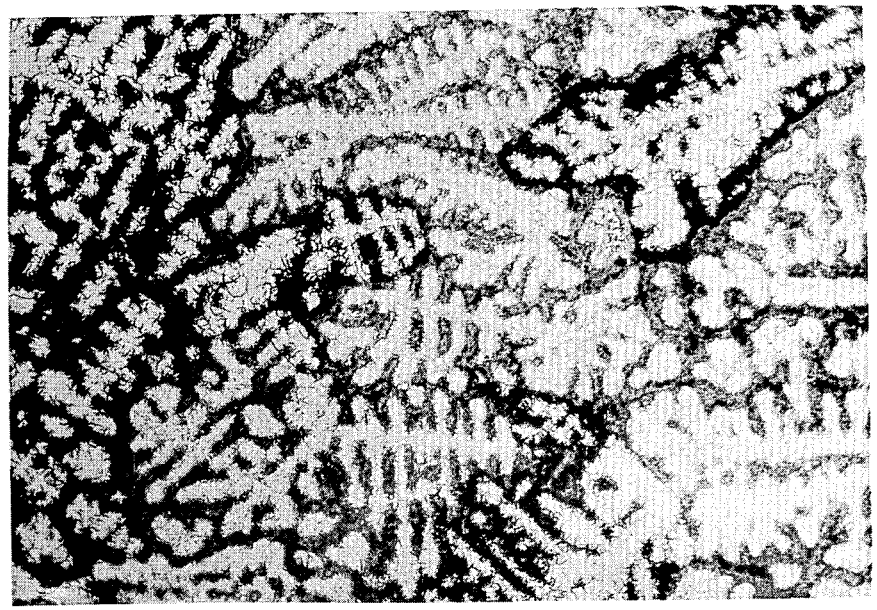

This invention relates to novel and improved relatively high yttrium-containing welding alloys of the reactive-refractory metals. More particularly, this invention relates to high yttrium-containing welding filler rods and the like composed of such improved alloys for use in welding, joining, fusing, and performing similar operations on reactive-refractory metals and their alloys.

It will be understood that as used herein the term "reactive-refractory metals" refers to both titanium (Ti) and zirconium (Zr), commonly termed the "reactive metals," and to those metals having melting points equal to or higher than that of chromium (1875° C.), particularly, chromium (Cr), vanadium (V), hafnium (Hf), columbium (Cb), molybdenum (Mo), tantalum (Ta), and tungsten (W).

In recent years, the use of reactive-refractory metal alloys has increased at a steadily growing rate, primarily because of their excellent elevated temperature strength properties. Fabrication of many promising materials has, however, been difficult, often because of the presence of too high a quantity of oxygen or nitrogen, or in some cases, carbon and hydrogen as interstitials in the alloys.

Even minor amounts of certain interstitials can cause some reactive-refractory alloy materials to become virtually impossible to fabricate. The problem of obtaining extremely pure materials is hence of great importance. Methods of accomplishing this object have typically involved either utilizing ultra-pure starting materials and minimizing contamination during melting in an electron beam furnace, or using charge materials of average commercial purity and adding a given amount of some gettering metal that will have a preferential affinity for impurities.

Although prior experimentation has shown that rare earth additions to reactive-refractory metals, including relatively low contents of yttrium (Y), will reduce their oxygen content and consequently improve their ductility, the alloys of this invention go beyond what has been achieved in the past by creating high residual yttrium-containing alloys that are particularly useful as welding filler rods.

The alloys of this invention have been found to be especially desirable in improving the resistance of Cb-base alloys to pick-up of contaminating oxygen (O) and nitrogen (N) during welding, fusing, joining, or similar operations. It is known that substantial additions of zirconium (Zr) and tantalum (Ta), as well as interstitial carbon (C) additions, significantly improve the physical properties of columbium (Cb) for many of its most common uses, and this invention does not adversely affect, disturb, or detract from the desirable properties introduced by such additions.

This invention demonstrates the feasibility of incorporating relatively high amounts of retained yttrium (Y) in an alloy, particularly a welding filler rod alloy of columbium (Cb) or other reactive-refractory metal, to achieve gettering and purification of both the weld metal itself and the surrounding metal base during the welding process. The alloys of this invention also provide resistance to contamination from the presence of incidental oxygen in the welding or melting atmosphere.

In accordance with the invention, the alloys are preferably prepared by mixing and compacting elemental and alloy or compound powders incorporating the ingredients of the alloys. The powdered compacts are then nonconsumably arc-melted to produce arc-melt castings of the alloys. Since the castings are ductile and fabricable, in accordance with the invention, they can readily be formed into desired shapes for use as welding filler rods.

In the prior art of welding reactive-refractory metals it has generally been necessary to use a very high purity argon atmosphere. If a thoriated-tungsten electrode is used, such as a W-2Th electrode, as is common in the prior art, it is necessary that the electrode in the zone of the weld be surrounded by argon to a pressure of at least ⅓ atmosphere. Argon at a pressure of ⅓ atmosphere normally includes contaminating oxygen to pressure of about 1000 microns of Hg. With Cb-base alloys oxygen or nitrogen pick-up during welding is particularly undesirable, since it results in making the alloys susceptible to corrosion by the alkali metals, particularly lithium (Li).

One of the principal uses for Cb-base alloys today is in nuclear reactor engineering. Oxygen content of Cb-base alloys used in nuclear reactor elements must be kept at low levels. Otherwise, the alloys lose their alkali metal compatibility and become subject to intergranular oxidation attack, particularly when used as structural containment vessels for liquid lithium. Resistance to lithium leaching is thus of fundamental importance in such Cb-base alloys. The oxides of columbium, such as CbO, $CbO_2$, and $Cb_2O_5$, at oxygen levels above 700 p.p.m. become susceptible to strong attack by lithium. A typical reaction is:

$$CbO + 2Li \rightarrow Li_2O + Cb$$

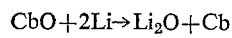

$Li_2O$ is more stable than the columbium oxides. It locates between and separates grain boundaries in columbium and permits lithium to leach through containment vessel walls and escape into the cover gas, or sheltering inert atmosphere. Such lithium leaching can cause numerous serious problems and may even cause a complete reactor shutdown. Elimination of the lithium leakage problem is of basic importance and is accordingly a fundamental object of the alloy of this invention, because lithium is the preferred primary alkali metal coolant for nuclear reactors.

To control the lithium leaching problem with Cb-base alloys and other reactive-refractory metal base alloys, such as Ta, V, Mo, and W, it has been discovered that if small quantities of Zr are added to the alloy base, the Zr will combine with interstitial oxygen, when it is present in excess amounts, to form zirconium oxides, which are more stable than lithium oxides.

To ensure formation of such zirconium oxides when excess interstitial oxygen is present it has previously been necessary to anneal the alloys at high temperatures, such as 2200° F. When the interstitial oxygen is tied-up by zirconium in sufficient amounts, the lithium leaching reaction is prevented. Such treatment enables alloys with oxygen contents as high as 2500 p.p.m. to be successfully used with liquid lithium.

It is significant, however, that the higher the intial oxygen content, the more questionable is the efficaciousness of the heat treatment. It is hence desirable to restrict the initial oxygen content of the alloys to no more than 700 p.p.m. When oxygen content can be kept at this level or lower, it is then not necessary to subject the alloys to the special heat treatment. It is, of course, advantageous to eliminate the heat treatment if possible to avoid the additional trouble, expense, and difficulty of administering a 2200° F. inert atmosphere anneal to structural parts that may be of wieldy sizes and shapes.

The prior art has thus addressed itself to the problem of providing reactive-refractory metal base alloys—particularly Cb-base alloys—that can be purified, or have their interstitial oxygen level reduced, by small additions of Y. Typically, Y is added in small amounts to powdered ingredients of the alloys. The powders are compacted. Then, as taught by the prior art, the resulting compact is either sintered or consumably arc-melted in an inert atmosphere.

Although by these prior art procedures it has been found possible to significantly reduce the interstitial oxygen levels of reactive-refractory metal compositions, the prior art has had no success in creating reactive-refractory metal base *alloys* having *relatively high amounts of retained* Y. The prior art has failed to create such alloys in spite of the need for them and their great value when used as filler rods for welding and similar operations.

The present invention has, however, succeeded in achieving reactive-refractory metal base alloys containing relatively large amounts of retained Y and low levels of interstitial oxygen (less than 400 p.p.m. for Cb-base alloys). Moreover, this beneficial result is attained even when the starting materials for the alloy melt contain relatively high oxygen levels (as high as 2000 p.p.m. or higher for Cb-base alloys).

With the present invention it is thus possible to create ductile, fabricable high residual Y-containing weld filler rods from reactive-refractory base starting materials that incorporate higher than acceptable levels of oxygen. This invention teaches that not only can the starting ingredients of the alloy melt be purified by Y-gettering and vaporization in the process of producing a weld filler rod alloy of superior qualities, but the resulting alloy formed can also have significantly greater amounts of retained Y than it has previously been possible to achieve.

It has been known in the prior art that Y can be used to getter oxygen from powdered reactive-refractory metal compacts when such compacts are sintered or are consumably arc-melted. This knowledge has been useful for producing sintered metal billets, or even true alloys, having very low retained values of Y (less than 1% Y by weight, for example), but until the present invention, no one has succeeded in creating a relatively high residual Y-containing reactive-refractory metal alloy, or one containing *retained* Y in amounts of from about 1 to 6% Y.

In prior art processes in which sintering of powdered compacts is taught, the art prescribes that Y content in the green compact should match oxygen content present with the object of removing essentially all the oxygen in the sintering process. This also results in the removal of almost all Y during sintering. What results is a sintered compact of considerably less than 100% theoretical density—not a true alloy—and which contains very little, if any, residual or retained Y.

Similarly, the beneficial results of high residual Y content have been denied to prior art alloys and processes which teach the use of Y to remove oxygen from reactive-refractory metal bases. This branch of the prior art discloses the use of Y in contents of up to a maximum of 2% of weight in Cb-base alloys *before melting* but demonstrates that only from 10 to 20% of the initial Y content is retained *after melting*. Also, in this line of prior art, which teach consumable arc-melting, it was found that compacts containing more than 1.5% by weight Y were difficult to melt and that 2% by weight Y was about the maximum Y content that could be incorporated before melting. In a typical prior art specimen, a Cb-base compact containing 1% by weight Y, when consumably arc-melted, produced an alloy having only 0.15% by weight Y. Thus, in this specimen, only 15% of initial Y content was retained after melting.

The alloys of this invention are a sharp departure from this prior art which teaches the scaling of Y content to a value that will ensure its being substantially used up in creation of the prior art alloys or that the amount of Y retained in the alloys should be very small. By contrast, the alloys of this invention contain residual or retained Y in amounts of from 1 to 6% by weight *after the alloys have been formed* by nonconsumable arc-melting. It is this unique high residual Y content in a true alloy that imparts to the alloys of this invention a new, beneficial, and useful result beyond anything taught or achieved by the prior art.

When these alloys are melted, for example, in the form of welding filler rods during welding at the high melt temperatures of the reactive-refractory metals, the Y in the filler rod combines with interstitial oxygen to form yttrium oxide compounds which are then boiled off in vapor phase resulting in purification of both the filler rod itself and the metal substrates in the zone of the weld. This purification is particularly important when the alloys of this invention are used as welding filler rods for large welds.

The larger structural parts of reactors will often have been treated adequately to prevent lithium leaching, such as, by the high-temperature anneal with alloys containing Zr previously described, or through the use of ultra-high purity ingredients to begin with, or by use of the teachings of this invention to remove interstitial impurities, particularly oxygen. When these larger parts are welded, however, there is a danger that the weld joint and surrounding areas of base metal will be contaminated by oxygen inclusion.

In the prior art, when joining refractory metal parts by welding in the conventional manner using a thoriated-tungsten electrode, it has been necessary to use a very high purity argon atmosphere. As previously stated, to support the welding arc, it was necessary that the argon be at a pressure of at least ⅓ atmosphere. At such argon pressures, even with high purity argon, there is normally an oxygen contamination of the inert gas to a partial pressure of 1000 microns of Hg.

Oxygen pick-up during welding, particularly in the melt of the welding filler rod materials, frequently resulted in unacceptable oxygen contamination of the weld joint or seam. If then became necessary to treat the oxygen-contaminated weld seams in the manner previously described for Cb-base parts. Frequently a Cb-1Zr weld rod was used, but even then a high-temperature anneal was still required to form the zirconium oxides needed to tie-up the excess oxygen and avoid corrosion by alkali metals, particularly lithium. Obviously, such high-temperature anneals in inert atmospheres are even more inconvenient to make after two parts had been joined together than they are to make on the individual parts before welding.

There has thus been a long standing need in the art for a welding filler rod alloy that can be used to make large field welds without requiring the purity of a "clean room" or large and expensive vacuum equipment to ensure the obtaining of a high purity weld that is uncontaminated by oxygen and that does not need an additional annealing treatment after welding.

Not only has a practical welding filler rod material been needed that would obviate the need for ultra-high purity welding atmospheres but also one that would obviate the necessity for ultra-high purity elemental ingredients in the welding filler rod alloy itself.

In the assembly and joining of reactor parts, the prior art had taught welding of, for example, Cb-1Zr parts to other Cb-1Zr parts by use of a Cb-1Zr filler rod. These Cb-1Zr welds had to be annealed for two hours at 2200° F. for two reasons:

(1) The annealing made the weld more corrosion resistant by inducing formation of ZrO; and (2) The anneal over-aged the weld so that it would not embrittle during usage.

When the welds are aged at 2200° F., they pass through a phenomenon in which the brittleness of the Cb-1Zr material, and similar materials from other refractory metals, rises to a peak of brittleness and then drops off again to a more ductile level as a function of the time over which the anneal is carried out. A 2-hour anneal at 2200° F. is usually sufficient to achieve the desired over-aging of the weld with Cb-1Zr alloys. This aging anneal thus serves to decrease the hardness of the weld.

In the prior art, weld rods made from such materials as Cb-1Zr, Cb-5Zr, Cb-5Ti, Cb-10Ti, and the like, were all subject to the embrittling aging reaction and thus required a time-consuming, expensive, and cumbersome high-temperature aging treatment in an inert atmosphere annealing furnace, before they could be considered fit for structural use.

As previously described, oxygen elimination from both Cb and Ta substrates is very important in preventing the lithium leaching effect. An important secondary reason for desiring oxygen removal from welds is that when oxygen levels are kept sufficiently low, it is unnecessary to subject the welds to the high-temperature anneal and over-aging reaction, and this costly procedure can be eliminated.

Another desideratum of a good welding filler rod material is that it will effect a reduction of nitrogen content, or at least not increase nitrogen content. Nirogen removal is desirable particularly with Group V alloys, namely, Cr, Mo, and W. Nitrogen is a very potent hardener or embrittler of Group VI metals and alloys, and it is thus advantageous to avoid any increase of nitrogen content with such metals, or if possible, to reduce nitrogen content during welding.

In fact, in general, it may be stated that Group VI metals and alloys are more susceptible to interstitial hardening than are the reactive-refractory metals generally, so that anything that can be done to reduce the level of interstitial embrittling elements in Group VI metals and alloys is helpful.

In accordance with this invention, it has been found that the creation and use of relatively high Y-containing alloys as welding filler rods achieves the new, useful, and beneficial result of reducing oxygen content during welding not only in the weld filler rod material but also in the surrounding or adjacent areas of the pieces being welded. The use of these alloys for welding not only reduces interstitial oxygen content but also effects a substantial reduction (up to 20%) in interstitial nitrogen content.

This result is achieved even though there may be some oxygen contamination in the cover gas or vacuum atmosphere being used for welding. The high residual Y-content of the welding filler rod thus effects not only a reduction in the existing oxygen content of the filler rod itself and surrounding areas of the weld but prevents weld contamination by oxygen existing in the welding atmosphere.

In view of the difficulties encountered in welding of refractory metal alloys caused by oxygen contamination during welding and the objects of existing interstitial oxygen, the advantages of having a weld rod material that not only prevents oxygen contamination but actually reduces interstitial oxygen in the weld are readily apparent.

Y has a melting point of 2748° F. and a boiling point of 5490° F. It accordingly may be used at welding temperatures in the 4500° F. range without catastrophic vaporization. This characteristic makes it eligible as a practical and suitable welding material for the high-melting reactive-refractory metals.

When Y is vaporized or boiled off during welding, it reacts with oxygen and nitrogen contaminants in the welding atmosphere or cover gas, and with oxygen and nitrogen in the melt itself. The reaction products of Y with oxygen and Y with nitrogen ($Y_2O_3$, possibly YO, and YN) are preponderantly formed in the vapor phase at the welding temperatures used and are thus subject to removal from the area of the weld, particularly when a dynamic vacuum is used for the welding atmosphere.

Another desideratum of a suitable weld rod for refractory-metal base substrates is that although it is desired to remove or tie-up oxygen and nitrogen interstitials, the means for achieving this should not at the same time tie-up or remove the desirable carbon content of such alloys. Carbon is frequently used as a constituent of such alloys for strengthening purposes, and it is thus important that the carbon not be removed by any agent or chemical reaction that is used to remove oxygen and nitrogen content.

In view of the foregoing, it is a primary object of this invention to provide, at a relatively low cost, new and improved relatively high residual Y-containing reactive-refractory metal base alloys that are true alloys, that are particularly useful as welding filler rods, and that exhibit the characteristic of picking-up and gettering oxygen and nitrogen interstitials both from the welding alloy itself and also from the surrounding welded substrates in the vicinity of the weld. These alloys, however, at the same time exhibit the characteristic of not tying up or interfering with carbon content in the alloy substrate being welded.

For example, in the case of columbium, current practice is now moving toward using a Cb-1Zr-0.1C alloy in place of Cb-1Zr. The alloys of this invention thus achieve one of their important objects in that they do not tie-up carbon in the base alloys or substrates being welded. Prior attempts to use Cb-5Zr and Cb-Ti alloys to achieve strength levels comparable to those now attainable with Cb-1Zr-0.1C alloys were unsuccessful, because the former alloys tended to tie-up carbon in the alloy base. When carbon in the base alloy or substrate is tied-up or bound to the alloying additives (Zr, Ti, and the like) needed to counteract the undesirable effects of interstitial or contaminating oxygen, it becomes unavailable for the important strengthening properties that it otherwise imparts to Cb.

It is thus an unexpected and new and useful result of this invention that its relatively high residual Y-containing welding alloys do not tie-up carbon in the base metal as was true of prior attempts to use alloys such as Cb-5Zr and Cb-Ti.

It is also a fundamental object of this invention to provide a relatively high residual Y-containing reactive-refractory metal base welding alloy that is capable of removing up to 80% of the interstitial oxygen and up to 20% of the interstitial nitrogen from the alloys themselves during formation of the alloys and that retains sufficient Y to remove undesirable excess amounts of oxygen from the substrate being joined and the cover gas in the vicinity of the weld during subsequent welding operations to ensure a high-purity, high-strength, ductile weldment. At the same time, the alloy exhibits the desirable characteristic of not tying-up or interfering with the carbon content of the substrates or alloys being welded.

Another object of this invention is to provide a new and improved relatively high residual Y-containing reactive-refractory metal alloy that can be used as a welding filler rod in making large field welds for joining together structural parts composed of reactive-refractory metal alloy base substrates without the need for the purity of a "clean room" or large and expensive vacuum equipment.

With the relatively high residual Y-containing welding alloys of this invention it is possible to achieve welds of very high purity that are free from oxygen and nitrogen contamination, and to do this without the need for an annealing treatment to over-age the alloys. Moreover, such welds can be made in the field without the necessity for using an ultra-high purity welding atmosphere. It is thus possible to use relatively inexpensive and unsophisticated vacuum equipment, or argon atmosphere equipment, to make such welds with temporary or portable type enclosures to contain the welding atmosphere.

A further object of this invention is to provide a reactive-refractory metal welding alloy containing sufficient Y that when welding proceeds, the Y in the welding alloy combines with excess oxygen and nitrogen interstitials and removes them by boiling-off or vaporization of the resulting compounds. Small amounts of residual Y left in the alloys or weld joints after welding are not detrimental to their desired properties.

A still further object of this invention is to provide a relatively high residual Y-containing weld material that does not greatly differ from or conflict in composition with the reactive-refractory metal base that is being welded or joined.

Other objects of this invention are to provide new relatively high residual Y-containing reactive-refractory welding alloys:

(1) that do not experience an embrittling aging reaction at elevated temperatures;
(2) that tie-up excess interstitial oxygen present in the substrates being welded;
(3) that makes it possible to eliminate the high-temperature annealing step required by prior art methods;
(4) that react with gaseous contaminants and prevent weld beads from becoming contaminated;
(5) that getter any oxygen that may get into the weld during welding and remove it or tie it up in the molten weld pool;
(6) that effect a grain size refinement in the alloys themselves and the weld joint; and
(7) that have no adverse effect on the corrosion resistance of alloys being welded.

With respect to grain size refinement, for example, the grain size of Y-containing Cb-1Zr alloys of this invention was distinctly finer than the grain size of Y-free Cb-1Zr. This grain size refinement is important in a large-size weld, because it assures there is no loss of strength in the weld zone, and in fact can lead to a weld that is stronger than the surrounding substrate material.

An additional object of this invention is to provide a new and improved relatively high residual Y-containing reactive-refractory metal alloy, particularly for use as a welding filler rod material, that except for its relatively high Y content and its capacity for refining and purifying the alloy itself through removal of interstitial oxygen and nitrogen, resembles the surrounding alloy substrate material very closely in composition and is compatible with it. For example, with the alloys of this invention, it is possible to use a relatively high Y-containing Cb-1Zr weld rod to weld plates of Cb-1Zr alloy plate-to-plate and to obtain a resulting weld joint that is equal to or higher in purity and strength than the alloy substrates forming the plates themselves.

Additional objects and advantages of the invention will be set forth in the description that follows, and in part will be obvious from the description, or may be learned by practice of the invention, the objects and advantages of the invention being realized and attained by means of the alloys and compositions particularly pointed out in the appended claims.

To achieve its objects and in accordance with its purposes, this invention embodies, as broadly described, a relatively high residual Y-containing reactive-refractory metal alloy consisting essentially of from about 1 to 6% by weight of retained Y and the balance essentially a reactive-refractory metal composition selected from the group of reactive-refractory metals consisting of Ti, Zr, the metals having a melting point of at least 1875° C., and alloys thereof.

As used in the specification and claims it will be understood that the term "reactive-refractory metal composition" refers both to the individual reactive-refractory metals, such as, Ti, Zr, Cb, Mo, Cr, Hf, V, W, and Ta, and to alloys having one or more of the reactive-refractory metals as their base, such as, for example, Cb-1Zr-0.1C, or Cb-15Ta-1Zr-0.1C (% expressed by weight).

In a preferred embodiment, the alloys of this invention consist essentially of from about 1 to 4% by weight of retained Y and the balance essentially a reactive-refractory metal composition selected from the group consisting of Ti, Zr, metals having a melting point of at least 1875° C., and alloys thereof.

In its most preferred form, this invention embodies an alloy, as above described, but having a retained Y content of from 1.2 to 3.6% by weight.

The alloys of this invention may also advantageously contain from 0.05 to 0.8% by weight of carbon as a strengthener.

The retained Y content of the alloys should not exceed 6% by weight, because higher retained Y-contents may weaken the alloy and cause it to lose some of its resistance to oxygen contamination. If too high a retained Y content exists, the normally poor oxidation resistance of the reactive-refractory metals, particularly Cb, at high temperatures can become catastrophically poor and a pyrophoric reaction can even result.

The alloys of this invention should have a retained or residual Y content of at least 1% by weight to ensure that sufficient Y is present to remove incidental oxygen during welding both from the substrates in the vicinity of the weld joint and in the cover gas or welding atmosphere. Preferably, the alloys should contain from 2 to 3% retained Y to ensure that under field, or less-than-ideal, conditions there will be a sufficient supply of Y to remove all oxygen present above acceptable levels.

For a clearer understanding of the invention, specific examples depicting it are given below. These examples are illustative only and are not to be understood as limiting the scope and underlying principles of the invention in any way.

The preparation of a typical relatively high residual Y-containing Cb-base alloy, in accordance with this invention, is carried out as described below.

The alloys were prepared from elemental and compound powders that were blended for ½ hour in a ball mill in a purified inert atmosphere. The blended powders were compacted at about 38 TSI in a 1.5 cm. diameter plunger dye under an inert atmosphere.

These compacts were then melted into 50 gram buttons in an arc-furnace using a nonconsumable thoriated-tungsten electrode. The furnace was designed with a radial sight port for direct visual observation of the arc. All melting was performed using a conventional W-2Th electrode.

After each sample alloy button was melted, it was inverted and remelted 3 times to ensure homogeneity. Great care was exercised in using a uniform melting procedure. Two (2) sections were cut from the center of each button, one for chemical analyses, and the other for structural evaluation and hardness data. Specimens were examined in the as-polished condition to determine particle size and distribution and concentration of any inclusions or secondary phases. The specimens were then etched with a dilute nitric-hydrofluoric acid solution for grain size measurements.

For the examples of the invention, the following *gen-*

*eral* compositions were used, as expressed in percent by weight:

Group I: Cb-1.5Zr
Group II: Cb-3.0Zr
Group III: Cb-3.0Zr-10Ta
Group IV: Cb-3Zr-25Ta Since performance of these materials is dependent on interstitial content, buttons corresponding to each composition were melted using the following general varieties of Cb:

(1) XM-315

Cb containing a relatively large amount of oxygen but lesser quantities of nitrogen and carbon (2) XM-316

Cb having very nearly the same oxygen and carbon levels as XM-315 but far more nitrogen.

The exact composition of the alloying constituents used in the examples are set forth in Table 1 below:

TABLE 1.—COMPOSITION OF ALLOYING CONSTITUENTS

| | Carbon | | Oxygen | | Nitrogen | | Hydrogen | |
|---|---|---|---|---|---|---|---|---|
| | w/o | a/o | w/o | a/o | w/o | a/o | w/o | a/o |
| Columbium: | | | | | | | | |
| XM-315 | 0.0600 | 0.458 | 0.0900 | 0.520 | 0.0420 | 0.275 | 0.0003 | 0.027 |
| XM-316 | 0.0700 | 0.523 | 0.0900 | 0.511 | 0.2700 | 1.742 | 0.0008 | 0.072 |
| Zirconium | 0.0024 | 0.018 | 0.1050 | 0.594 | 0.0160 | 0.103 | 0.0019 | 0.170 |
| Tantalum | 0.0100 | 0.149 | 0.0185 | 0.207 | 0.0045 | 0.057 | | |
| Yttrium | 0.2850 | 1.902 | 1.78 | 8.910 | 0.032 | 0.183 | 0.0103 | 0.818 |

The general compositions of the alloys making up the examples of the invention are set forth in Table 2 below:

| | Nominal composition, w/0 | Columbium powder |
|---|---|---|
| Group: | | |
| I | Cb-1.5Zr | XM-315 |
| | Cb-1.5Zr | XM-316 |
| II | Cb-3.0Zr | XM-315 |
| | Cb-3.0Zr | XM-316 |
| III | Cb-3.0Zr-10.0Ta | XM-315 |
| | Cb-3.0Zr-10.0Ta | XM-316 |
| IV | Cb-3.0Zr-25.0Ta | XM-315 |
| | Cb-3.0Zr-25.0Ta | XM-316 |

The *actual* alloy compositions forming the examples of the invention are set forth in Tables 3A and 3B below.

Table 3A gives the composition of the examples not containing Y, and Table 3B gives the corresponding alloy examples containing Y. In the alloys of Table 3B about twice as much Y was added as the sum of the atomic percentages of oxygen and nitrogen present in all material composing the pre-melt charge.

For each of the alloy examples shown in Tables 3A and 3B compositions are given in three different values:

(a) the intended atomic percent,
(b) the actual atomic percent, and
(c) the actual weight percent.

The values reflected under (a) above for each example thus show the pre-melt composition of each alloy forming an example, while the values given under (b) and (c) show the resulting composition of each alloy example after melting.

TABLE 3A.—COLUMBIUM BUTTONS WITHOUT YTTRIUM

| Example No. | Cb | Zr | Ta | C | O | N | H |
|---|---|---|---|---|---|---|---|
| Group I: | | | | | | | |
| 1, a | 97.145 | 1.605 | | 0.456 | 0.519 | 0.273 | |
| b | 96.940 | 1.782 | | 0.419 | 0.562 | 0.268 | 0.026 |
| c | 98.036 | 1.770 | | 0.055 | 0.098 | 0.041 | 0.0003 |
| 2, a | 95.661 | 1.584 | | 0.526 | 0.508 | 1.718 | |
| b | 94.746 | 1.667 | | 0.487 | 0.488 | 2.538 | 0.071 |
| c | 97.762 | 1.690 | | 0.065 | 0.087 | 0.395 | 0.0008 |
| Group II: | | | | | | | |
| 3, a | 95.749 | 3.017 | | 0.442 | 0.516 | 0.273 | |
| b | 95.388 | 3.208 | | 0.480 | 0.418 | 0.477 | 0.026 |
| c | 96.600 | 3.190 | | 0.063 | 0.073 | 0.073 | 0.0003 |
| 4, a | 94.301 | 2.979 | | 0.513 | 0.509 | 1.696 | |
| b | 93.250 | 3.363 | | 0.503 | 0.552 | 2.189 | 0.143 |
| c | 96.093 | 3.400 | | 0.067 | 0.098 | 0.340 | 0.0016 |
| Group III: | | | | | | | |
| 5, a | 90.290 | 3.172 | 5.336 | 0.432 | 0.506 | 0.260 | |
| b | 89.316 | 3.495 | 5.659 | 0.489 | 0.663 | 0.337 | 0.037 |
| c | 85.879 | 3.300 | 10.600 | 0.061 | 0.110 | 0.049 | 0.0004 |
| 6, a | 88.992 | 3.134 | 5.272 | 0.492 | 0.500 | 1.607 | |
| b | 88.684 | 3.122 | 5.114 | 0.514 | 0.575 | 1.897 | 0.088 |
| c | 86.807 | 3.000 | 9.750 | 0.065 | 0.097 | 0.280 | 0.0009 |
| Group IV: | | | | | | | |
| 7, a | 80.991 | 3.438 | 14.461 | 0.400 | 0.469 | 0.238 | |
| b | 83.122 | 3.742 | 11.829 | 0.391 | 0.511 | 0.312 | 0.091 |
| c | | 3.340 | 20.940 | 0.046 | 0.080 | 0.043 | 0.0009 |
| 8, a | 79.965 | 3.403 | 14.312 | 0.464 | 0.466 | 1.388 | |
| b | 83.073 | 3.310 | 11.114 | 0.385 | 0.472 | 1.545 | 0.109 |
| c | | 3.000 | 19.980 | 0.046 | 0.075 | 0.215 | 0.0011 |

TABLE 3B.—COLUMBIUM BUTTONS CONTAINING YTTRIUM

| Example No. | Cb | Zr | Ta | Y | C | O | N | H |
|---|---|---|---|---|---|---|---|---|
| Group I: | | | | | | | | |
| 9, a | 94.803 | 1.504 | | 2.198 | 0.487 | 0.732 | 0.273 | |
| b | 96.370 | 1.412 | | 1.273 | 0.521 | 0.177 | 0.226 | 0.017 |
| c | 97.236 | 1.400 | | 1.230 | 0.068 | 0.031 | 0.034 | 0.0002 |
| 10, a | 90.312 | 1.480 | | 4.981 | 0.600 | 0.991 | 1.633 | |
| b | 92.920 | 1.290 | | 3.045 | 0.648 | 0.055 | 2.003 | 0.035 |
| c | 95.303 | 1.300 | | 2.990 | 0.086 | 0.010 | 0.310 | 0.0004 |
| Group II: | | | | | | | | |
| 11, a | 93.312 | 3.008 | | 2.198 | 0.487 | 0.732 | 0.260 | |
| b | 95.030 | 2.908 | | 1.222 | 0.554 | 0.080 | 0.187 | 0.026 |
| c | 95.826 | 2.880 | | 1.180 | 0.071 | 0.014 | 0.028 | 0.003 |
| 12, a | 88.872 | 2.906 | | 4.982 | 0.584 | 0.991 | 1.608 | |
| b | 90.903 | 3.211 | | 3.735 | 0.506 | 0.187 | 1.428 | 0.026 |
| c | 92.808 | 3.220 | | 3.650 | 0.067 | 0.033 | 0.220 | 0.0003 |
| Group III: | | | | | | | | |
| 13, a | 87.760 | 3.162 | 5.319 | 2.311 | 0.464 | 0.722 | 0.260 | |
| b | 88.096 | 4.139 | 5.622 | 1.332 | 0.476 | 0.127 | 0.176 | 0.028 |
| c | 84.304 | 3.890 | 10.480 | 1.220 | 0.059 | 0.021 | 0.025 | 0.0003 |
| 14, a | 83.326 | 3.114 | 5.239 | 5.241 | 0.567 | 0.995 | 1.515 | |
| b | 83.453 | 3.114 | 7.061 | 3.903 | 0.556 | 0.114 | 1.729 | 0.0 |
| c | 79.971 | 2.930 | 13.180 | 3.580 | 0.069 | 0.019 | 0.250 | 0.0007 |
| Group IV: | | | | | | | | |
| 15, a | 78.268 | 3.427 | 14.411 | 2.504 | 0.434 | 0.715 | 0.237 | |
| b | 77.701 | 4.273 | 15.941 | 1.325 | 0.485 | 0.089 | 0.174 | 0.009 |
| c | 67.968 | 3.670 | 27.160 | 1.110 | 0.055 | 0.013 | 0.023 | 0.0001 |
| 16, a | 73.824 | 3.377 | 14.203 | 5.683 | 0.547 | 1.014 | 1.349 | |
| b | 72.605 | 4.596 | 16.080 | 4.244 | 0.575 | 0.209 | 1.345 | 0.341 |
| c | 64.270 | 4.000 | 27.760 | 3.600 | 0.066 | 0.032 | 0.180 | 0.0033 |

A comparison of the before-melt and after-melt interstitial levels of oxygen, nitrogen, and carbon of the Y-free Group I examples of Table 3A with the Y-containing Group I examples of Table 3B clearly reflects the beneficial new and useful results of the invention. Succinctly stated, the examples of Table 3A and 3B show that it is possible to create *arc-melted* reactive-refractory metal *alloys* having retained Y-contents significantly higher than any known in the prior art, thus permitting the creation of welding filler rods that can be successfully used to weld reactive-refractory metal alloys under less-than-ideal, or "field," conditions without the danger of introducing undesirable interstitial elements, particularly oxygen, into the weld joint itself or the pieces being welded. Moreover, as shown by the foregoing examples, relatively high Y-additions to Cb-base materials resulted in the removal of as much as 90% of the oxygen and 20% of the nitrogen in the arc-melted products. Accordingly, the use of high Y-containing welding filler rods produced by this invention may actually be used to purify and up-grade portions of substrates in the vicinity of the welding zone.

In accordance with the invention, the data of Tables 3A and 3B also establish that oxygen removal appears to be a linear function of Y loss. This relationship—for the examples shown—may be expressed in the following terms:

Atomic percent Y lost=(1.3) atomic percent oxygen lost+0.15

The results set forth in Tables 3A and 3B also establish that carbon concentration is not appreciably altered in any of these materials by addition of Y.

The chemistry data for the alloys of the example in Tables 3A and 3B show that not only does Y reduce oxygen concentration, but nitrogen concentration is also reduced. In no case, however, is the nitrogen reduction as substantial as that for oxygen. Y caused no change, or relatively little change, in the carbon concentration of any of the materials.

The results for hydrogen concentration were inconclusive, because of the quantitative limitations of the analytical chemistry technique.

It can be discerned from the data of Tables 3A and 3B that the amount of Y lost is primarily dependent on the oxygen lost, or vice versa. Moreover, the data in Tables 3A and 3B show that the oxygen reductions were of the same order of magnitude for the different basic or generally alloys of Groups I–IV:

(a) Cb-1.5Zr,
(b) Cb-3Zr,
(c) Cb-3Zr-10Ta, and
(d) Cb-3Zr-25Ta.

Thus, for Cb of a given interstitial content, various additions of Zr and Ta exerted relatively minor influences on the oxygen reduction. In this respect, oxygen removal tended to decrease slightly in the Cb-Zr mixtures and to increase when Ta was added. It may then be said, in accordance with the invention, that Ta has a slight beneficial effect on oxygen removal by Y in Cb-base alloys.

If it is assumed that all the oxygen was removed in the form of $Y_2O_3$ and that no Y vaporized or was lost as some other oxide or interstitial compound, it would be expected that about half as much Y would be lost as is actually lost in the examples. This difference between actual loss and theoretical loss may be attributed to Y vaporization and to volatilization of YN and possibly YO. Since the boiling point of Y is only slightly greater than the melting point of Cb, Y volatilization probably accounts for over 50% of the difference between theoretical and actual loss.

Since YN has a melting point of 2400° C. in a nitrogen atmosphere, it should be anticipated that some Y would be lost by means of vaporization of its nitride. This expectation is further supported by the fact that as much as 20% of the nitrogen in the starting materials of the examples was removed during the melting procedure in the Y-containing buttons of Table 3B.

The examples of this invention also establish that in contrast to the pronounced gettering effect that Y has on oxygen and nitrogen, a relatively insignificant amount of carbon was lost during melting because of Y additions.

The minor influence of Zr and Ta on oxygen loss can be explained in terms of their indirect effect on the extent of $Y_2O_3$ volatility. The degree of vaporization of this oxide during the melting of any button is a function only of the melting temperature of the metallic mixture, provided all melting periods are of equal duration. The addition of Zr depresses the melting point of Cb and consequently decreases the amount of oxygen removed, whereas Ta has the opposite effect.

Metallographic examination of the specimens of the examples indicated that oxide phase particles, presumably $ZrO_2$, were present within all of the buttons melted without Y, but were not present within any of the Y-containing examples. As expected, the size and concentration of these oxide particles varied with the oxygen and Zr levels. An apparent nitride phase became visible when the level of nitrogen enrichment equaled or exceeded 1.5 atomic percent.

Although Y caused the disappearance of all oxide phase, it did not noticeably diminish the nitride or carbide concentration. The addition of Y to the materials high in oxygen and nitrogen, in accordance with the invention, caused reductions in the amount of coring. This reduction in coring is illustrated by comparing FIG. 1 with FIG. 2. FIG. 1 is a photomicrograph of a Cb-9.8Ta-3.0Zr alloy without Y, and FIG. 2 is a photomicrograph of a Cb-13.1Ta-2.9Zr-3.6Y alloy.

Figure 2:
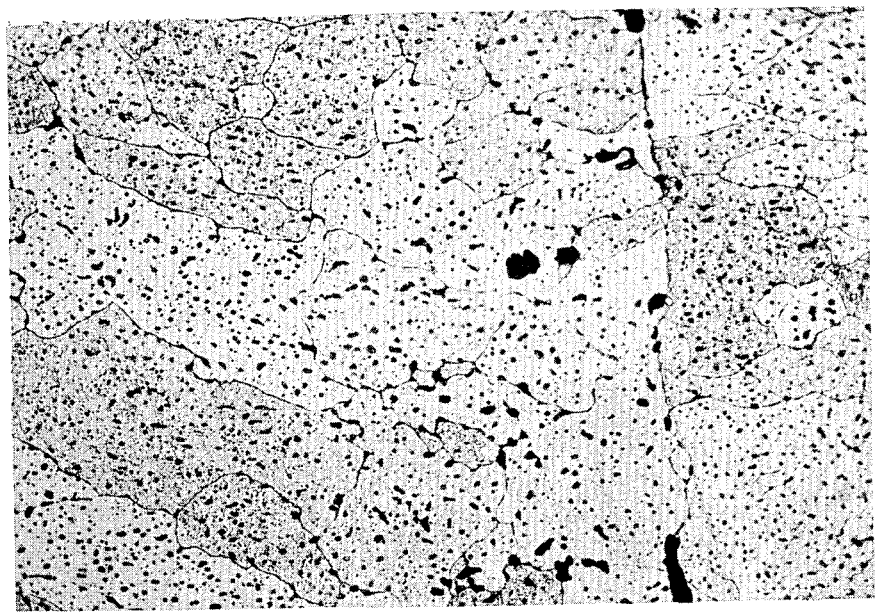

Both alloys are oxygen and nitrogen enriched and both are essentially the same alloys except that the alloy of FIG. 1 includes no Y but the alloy of FIG. 2 contains Y. A comparison of FIG. 1 with FIG. 2 shows a distinct reduction in coring and grain size attributable to the Y addition. The alloy specimens in both FIGS. 1 and 2 were etched before photographing and each photomicrograph has been enlarged 200 times. Since the Y-containing phases of the alloy shown in FIG. 2 could not be readily retained during polishing, numerous voids in both grains and grain boundaries are observable in FIG. 2.

Grain size measurements were made on all specimens. Although the variation in grain size was comparable for each specimen, as is inevitable with as-cast material, analysis of the data indicated that Y produced a distinct grain size refinement. This is illustrated in FIGS. 1 and 2.

The degree of grain size reduction achieved by the relatively high Y additions in the foregoing examples was approximately 50%. Hardness data for all of the examples is presented in Table 4 below.

As reflected by the data in Table 4, in the absence of Y, gross hardness measurements demonstrate that both oxygen and nitrogen are relatively potent hardeners of Cb. In contrast, carbon is known to be a much less effective hardener, but it is a good strengthener. When relatively high amounts of Y are added to oxygen and nitrogen containing compositions, they become generally softer as indicated by the hardness data.

In accordance with the invention, relatively high amounts of Y are thus effective in improving the ductility of the reactive-refractory metal base alloys with which they are used. The addition of Y to the compositions of the examples caused grain size reductions of about 50%. Y also reduced the degree of coring in the foregoing arc-melted examples prepared from Cb containing relatively large concentrations of oxygen and nitrogen.

The following additional examples may also be made up and illustrate the beneficial effects of Y-additions to refractory metals other than Cb.

TABLE 4.—ALLOY HARDNESSES

| | A. Columbium buttons without Yttrium | | | B. Columbium buttons containing Yttrium | |
|---|---|---|---|---|---|
| Example No. | Actual composition, w/o | Gross hardness, VHN | Example No. | Actual composition, w/o | Gross hardeess, VHN |
| Group I: | | | Group I: | | |
| 1 | Cb-1.8Zr | 205 | 9 | Cb-1.4Zr-1.2Y | 135 |
| 2 | Cb-1.7Zr | 366 | 10 | Cb-1.3Zr-3.0Y | 127 |
| Group II: | | | Group II: | | |
| 3 | Cb-3.2Zr | 201 | 11 | Cb-2.9Zr-1.2Y | 144 |
| 4 | Cb-3.4Zr | 245 | 12 | Cb-3.2Zr-3.6Y | 152 |
| Group III: | | | Group III: | | |
| 5 | Cb-3.3Zr-10.6Ta | 206 | 13 | Cb-3.9Zr-10.5Ta-1.2Y | 151 |
| 6 | Cb-3.0Zr-9.8Ta | 368 | 14 | Cb-2.9Zr-13.2Ta-3.6Y | 150 |
| Group IV: | | | Group IV: | | |
| 7 | Cb-3.3Zr-20.9Ta | 214 | 15 | Cb-3.7Zr-27.2Ta-1.1Y | 167 |
| 8 | Cb-3.0Zr-20.0Ta | 353 | 16 | Cb-4.0Zr-27.7Ta-3.6Y | 161 |

EXAMPLE 17

A Ta-base ingot is made up using the same procedures as described for the earlier Cb-base examples. This ingot has the following composition:

Ta-1.5Zr-2Y

Results obtained with this alloy are similar to those obtained with the Cb-base alloys of the earlier examples. As compared with a Ta-1.5Zr alloy, Y addition to this Ta-base alloy are observed to cause refinement of the second phase particles and produce a refinement of substructure size, although no softening of the matrix itself is observed.

EXAMPLE 18

A V-base ingot is made up using the procedures followed in making the Cb-base examples previously described. This ingot has the following composition:

V-1.5Zr-2Y

As compared with a V-1.5Zr alloy, the Y in the specimen of this example causes a refinement of grain size and also a 10 to 15% decrease in matrix hardness.

EXAMPLE 19

A Mo-base ingot is made up following the procedure earlier described for the Cb-base alloy examples. The composition of this ingot is as follows:

Mo-1.5Zr-2Y

As compared with a Mo-1.5Zr alloy, the Y addition causes up to a 10% softening of the matrix, and more significantly, decreases the hardness of particles in the grain boundaries by as much as 50% This latter result is particularly significant, since Mo-materials are normally subject to grain boundary failures.

EXAMPLE 20

A W-base ingot is made up using the procedures described earlier for the Cb-base alloy examples. This ingot has the following composition:

W-1.5Zr-2Y

The results with this example are the same as those observed with respect to the Mo-base specimen of Example 19.

The following examples describe additional alloys within the scope of the invention, which satisfy its objects and yields its new and useful results.

EXAMPLE 21

The filler rod of this example is composed of 5% by weight of Y and the balance essentially chromium (Cr-5Y).

EXAMPLE 22

The filler rod of this example is composed of 3% by weight of Y and the balance essentially hafnium (Hf-3Y).

EXAMPLE 23

The filler rod of this example is composed of 1.5% by weight of Zr, 2% by weight of Y, and the balance essentially chromium (Cr-1.5Zr-2Y).

EXAMPLE 24

The filler rod of this example is composed of 1.5% by weight of Zr, 3% by weight of Y, and the balance essentially hafnium (Hf-1.5Zr-3Y).

When any reference is made herein to parts or percentages of elements, it is intended that parts or percentages by weight are referred to unless otherwise indicated.

The invention in its broader aspects is not limited to the specific details shown and described, but departures may be made from such details within the scope of the accompanying claims without departing from the principles of the invention and without sacrificing its chief advantages.

What is claimed is:
1. A welding filler rod for use in welding and joining reactive-refractory metal compositions, the filler rod being composed of an arc-melted alloy consisting essentially of about 3% by weight of yttrium, about 1.5% weight of zirconium, balance essentially columbium or an alloy thereof.
2. A welding filler rod for use in welding and joining reactive-refractory metal compositions, the filler rod being composed of an arc-melted alloy consisting essentially of about 3.6% by weight of yttrium, about 3% by weight of zirconium, balance essentially columbium or an alloy thereof.
3. Welding filler rod for use in welding and joining reactive-refractory metal compositions, the filler rod being composed of an arc-melted alloy consisting essentially of about 3.6% by weight of yttrium, about 3% by weight of zirconium, about 15% by weight of tantalum, balance essentially columbium or an alloy thereof.
4. A welding filler rod for use in welding and joining reactive-refractory metal compositions, the filler rod being composed of an arc-melted alloy consisting essentially of about 3.6% by weight of yttrium, about 4% by weight of zirconium, about 30% by weight of tantalum, balance essentially columbium or an alloy thereof.

References Cited

UNITED STATES PATENTS

| Re. 26,122 | 12/1966 | Semmel, Jr. | 75—174 |
| 3,236,638 | 2/1966 | Clark | 75—174 |
| 2,856,281 | 10/1958 | Cremer et al. | 75—134 |
| 2,955,937 | 10/1960 | McGurty et al. | 75—176 |
| 3,011,889 | 12/1961 | Baranow | 75—176 |
| 3,028,236 | 4/1962 | Wlodek et al. | 75—134X |
| 3,138,453 | 6/1964 | Foster et al. | 75—84X |

(Other references on following page)

UNITED STATES PATENTS

| | | | |
|---|---|---|---|
| 3,141,235 | 7/1964 | Lenz | 29—182 |
| 3,156,560 | 11/1964 | Semmel | 75—174 |
| 3,162,530 | 12/1964 | Harrison | 29—182X |
| 3,163,744 | 12/1964 | Aconsky et al. | 75—176X |
| 3,174,853 | 3/1965 | Sim et al. | 75—176 |
| 3,227,548 | 1/1966 | Clark | 75—176 |
| 3,266,892 | 8/1966 | Worcester et al. | 75—174 |
| 3,268,328 | 8/1966 | Torti | 75—174 |
| 3,293,741 | 12/1966 | Gilliland | 75—134X |
| 3,300,285 | 1/1967 | Pugh et al. | 75—207X |
| 3,309,108 | 3/1967 | Mueller et al. | 75—174X |
| 3,310,398 | 3/1967 | Kneip | 75—134 |
| 3,312,539 | 4/1967 | Marshall et al. | 75—134X |

OTHER REFERENCES

"Columbium-Base Alloys," General Electric Company Bulletin, February 1962, pages 8 and 9.

CARL D. QUARFORTH, Primary Examiner

B. H. HUNT, Assistant Examiner

U.S. Cl. X.R.

75—134